US006580431B1

(12) United States Patent
Deosaran et al.

(10) Patent No.: US 6,580,431 B1
(45) Date of Patent: Jun. 17, 2003

(54) SYSTEM, METHOD, AND COMPUTER PROGRAM PRODUCT FOR INTELLIGENT MEMORY TO ACCELERATE PROCESSES

(75) Inventors: Trevor Deosaran, Morgan Hill, CA (US); Ram Prabhakar, San Jose, CA (US)

(73) Assignee: nexmem, San Jose, CA (US)

( * ) Notice: Subject to any disclaimer, the term of this patent is extended or adjusted under 35 U.S.C. 154(b) by 0 days.

(21) Appl. No.: 09/286,289

(22) Filed: Apr. 6, 1999

Related U.S. Application Data

(63) Continuation-in-part of application No. 09/262,049, filed on Mar. 4, 1999, now abandoned.

(51) Int. Cl.⁷ .................................................. G06F 3/00
(52) U.S. Cl. ...................... 345/503; 345/764; 345/966; 700/33; 700/32
(58) Field of Search ................................ 345/764, 962, 345/966, 835, 503, 744; 709/320, 321, 327, 328, 201, 203; 712/17, 15, 36, 43; 700/32, 33, 46

(56) References Cited

U.S. PATENT DOCUMENTS

| | | | | |
|---|---|---|---|---|
| 3,665,493 A | * | 5/1972 | Glowzewski et al. ....... 318/561 |
| 4,100,532 A | | 7/1978 | Farnbach .......... 340/146.3 MA |
| 4,710,864 A | * | 12/1987 | Li ............................... 700/47 |
| 4,896,257 A | | 1/1990 | Ikeda et al. ................. 364/200 |
| 4,924,376 A | | 5/1990 | Ooi ............................ 364/200 |
| 5,115,391 A | * | 5/1992 | Puthenpura .................... 700/32 |
| 5,193,190 A | | 3/1993 | Janczyn et al. ............. 395/700 |
| 5,210,862 A | | 5/1993 | DeAngelis et al. ......... 395/575 |
| 5,212,794 A | | 5/1993 | Pettis et al. ................. 395/700 |
| 5,274,815 A | | 12/1993 | Trissel et al. ............... 395/700 |
| 5,278,963 A | | 1/1994 | Hattersley et al. .......... 395/400 |
| 5,305,389 A | | 4/1994 | Palmer ........................... 382/1 |
| 5,394,537 A | | 2/1995 | Courts et al. ................ 395/425 |
| 5,430,878 A | | 7/1995 | Straub et al. ................ 395/700 |
| 5,457,799 A | | 10/1995 | Srivastava ................... 395/700 |
| 5,473,773 A | | 12/1995 | Aman et al. ................. 395/650 |
| 5,485,609 A | | 1/1996 | Vitter et al. ................. 395/600 |
| 5,535,329 A | | 7/1996 | Hastings ................. 395/183.11 |
| 5,559,978 A | | 9/1996 | Spilo ........................... 395/413 |
| 5,630,097 A | | 5/1997 | Orbits et al. ................ 395/492 |
| 5,651,136 A | | 7/1997 | Denton et al. .............. 395/445 |
| 5,655,122 A | | 8/1997 | Wu .............................. 395/705 |
| 5,659,752 A | | 8/1997 | Heisch et al. ............... 395/704 |
| 5,664,191 A | | 9/1997 | Davidson et al. ........... 395/670 |
| 5,680,565 A | | 10/1997 | Glew et al. ................. 395/415 |
| 5,691,920 A | | 11/1997 | Levine et al. .......... 364/551.01 |
| 5,694,572 A | | 12/1997 | Ryan ........................... 395/445 |
| 5,699,543 A | | 12/1997 | Saxena ........................ 395/413 |
| 5,794,011 A | * | 8/1998 | Paul et al. ..................... 703/22 |
| 5,812,780 A | * | 9/1998 | Chen et al. ................. 709/224 |
| 5,841,652 A | * | 11/1998 | Sanchez ....................... 700/44 |
| 5,944,819 A | * | 8/1999 | Kumar et al. .................. 713/1 |
| 6,049,798 A | | 4/2000 | Bishop et al. ................ 707/10 |

* cited by examiner

*Primary Examiner*—John Cabeca
*Assistant Examiner*—Kieu D. Vu
(74) *Attorney, Agent, or Firm*—Sterne, Kessler, Goldstein & Fox P.L.L.C.

(57) ABSTRACT

An intelligent memory system, method, and computer program product for enabling stand-alone or distributed client-server software applications to operate at maximum speeds on a personal computer and the like. An intelligent memory allows the acceleration of computer software processes through process virtual memory, application optimization, multiprocessor control, and system strategies. The intelligent memory includes both control logic and memory. The control logic uses an application database and system database to determine a set of modifications to the computer, application, and/or operating system, while the memory stores the application and allows the control logic to implement the set of modifications.

18 Claims, 7 Drawing Sheets

| Application 1 |
|---|
| Application 2 |
| Application 3 |
| Application 4 |
| Application 5 |
| Application 6 |
| Application 7 |
| Application 8 |
| Application 9 |
| Application 10 |

FIG. 7A

| Application 5 |
|---|
| Application 6 |
| Application 3 |
| Application 7 |
| Application 1 |
| Application 2 |
| Application 4 |
| Application 10 |
| Application 8 |
| Application 9 |

FIG. 7B

| Application 8 |
|---|
| Application 5 |
| Application 6 |
| Application 3 |
| Application 7 |
| Application 1 |
| Application 2 |
| Application 4 |
| Application 10 |
| Application 9 |

FIG. 7C

SYSTEM, METHOD, AND COMPUTER PROGRAM PRODUCT FOR INTELLIGENT MEMORY TO ACCELERATE PROCESSES

CROSS REFERENCE TO RELATED APPLICATION

This application is a continuation-in-part application of, and claims priority to U.S. patent application Ser. No. 09/262,049, filed Mar. 4, 1999 now abandoned.

BACKGROUND OF THE INVENTION

1. Field of the Invention

The present invention relates generally to computer processing of software applications, and more particularly to optimizing the processing speed of software applications.

2. Related Art

Within the computer industry, it is common for technological advances to cause processor chip speeds to increase at a fast pace—consider, for example, the observation of Moore's Law. The development of software technology, however, has not kept pace with processor speed increases. Thus, when speaking of microprocessors within personal computers, for example, there currently exist many software application technologies that cannot take advantage of the increases in performance of the processor chips. The above-stated disparity does not manifest itself as a problem in general (i.e., computer) system performance, but rather application performance. That is, today's advanced processor chips are executing instructions at a faster pace, yet this increase in speed is not being passed on to software applications.

The above-mentioned problem demonstrates itself in two ways. First, the actual operation speed of a particular software application, even when executed on a faster processor, does not improve. This is due to the increased complexity of today's software applications and the fact that operating systems are now handling more processes less efficiently than before. Second, there has been a lack of technological advances in software applications that require low latency operations. For example, the Intel® Pentium® Pro processor can do more multiple operations faster than many currently-available graphics chips. These graphics chips, however, are currently required to achieve good graphics performance. This is because the increased performance of the Intel® Pentium® processors and the like are not passed on to the software applications that require it. These processor cycles are unnecessarily wasted.

While there currently exist many performance enhancement products, such as PerfMan® available from Information Systems Manager, Inc. of Bethlehem, Pa, and Wintune™ available from the Microsoft Corporation of Redmond, Wash, these do not address the above-identified needs. Many performance management products simply allow users to change the priority or CPU time slice of an application in a brute-force manner without any intelligence. Typical PC-users, however, do not comprehend such concepts. Further, with the complexity of operating systems increasing, most software applications are written to include a large amount of system calls to the operating system (OS). Thus, increasing an application's priority takes away CPU cycles from the OS and the end result is a degradation of performance—not an enhancement. Also, many processes are slowed while waiting for input/output (I/O). Thus, simply increasing CPU time slices does not help efficiency (i.e., it does not address the problem).

Therefore, what is needed is a system, method, and computer program product for intelligent memory to accelerate processes that allows software applications, both stand-alone and those distributed in a client-server model, to fully utilize the speed of modem (and future) processor chips. The intelligent memory would function in a computing environment where the OS and processors are fixed (i.e., where optimization is not under the control of the PC end-user). Such a system, method, and computer program product would enable software applications to operate at maximum speeds through the acceleration of, for example, context switching and I/O interfacing.

SUMMARY OF THE INVENTION

The present invention is directed towards a system, method, and computer program product for intelligent memory to accelerate processes that meets the above-identified needs and allows software applications to fully utilize the speed of modern processor chips.

The system includes a graphical user interface, accessible via a users computer, for allowing the user to select applications executing on the computer to accelerate, an application database that contains profile information on the applications, and a system database that contains configuration information about the computer's configuration. The system also includes an intelligent memory, attached to the computer's system bus as a separate chip or to the processor itself, includes control logic that uses the application database and the system database to determine a set of modifications to the computer, application, and/or operating system. The intelligent memory also includes a memory which stores the executing applications and allows the control logic to implement the set of modifications during execution. The system thereby allows applications to more fully utilize the power (i.e., processing capabilities) of the processor within the computer.

One advantage of the present invention is that it provides a reduced-cost solution for Windows 95/98™ or NT™/ Intel® systems (and the like) currently requiring special purpose processors in addition to a central processor.

Another advantage of the present invention is that it allows special purpose computing systems to be displaced by Windows 95/98™ orNT™ based systems (and the like) at a better price-to-performance ratio.

Another advantage of the present invention is that it makes performance acceleration based on run-time information rather than conventional operating system static (i.e., high, medium, and low) priority assignments. Further, the present invention allows users to achieve run-time tuning, which software vendors cannot address. The present invention operates in an environment where compile-time tuning and enhancements are not options for end-users of commercial software applications.

Yet another advantage of the present invention is that it makes performance acceleration completely transparent to the end user. This includes such tasks as recompiling, knowledge of processor type, or knowledge of system type.

Yet still another advantage of the present invention is that it makes performance acceleration completely independent of the end-user software application. This includes recompiling, tuning, and the like.

Yet still another advantage of the present invention is that it allows performance acceleration of stand-alone computer software applications, as well as client-server software applications executing in a distributed fashion over a network.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 7A–7C are window or screen shots of application performance tables generated by the graphical user interface of the present invention.

Detailed Description of the Preferred Embodiments

Table of Contents

I. Overview
II. System Architecture
III. System Operation
  A. Dataflow
  B. Methodology
  C. Graphical User Interface
IV. Accelerations
  A. Specific Accelerations
  B. General Strategies
V. Client-Server Applications
VI. Example Implementations
VII. Conclusion

I. Overview

The present invention relates to a system, method, and computer program product for intelligent memory to accelerate processes that allows software applications to fully utilize the speed of modern (and future) processor chips. In an embodiment of the present invention, an intelligent memory chip is provided that interfaces with both the system bus and the peripheral component interconnect (PCI) bus of a computer's circuit board (i.e., motherboard). In alternative embodiments, the intelligent memory chip of the present invention may be connected to the motherboard in a variety of ways other than through the PCI bus.

The present invention also includes control software, controllable from a graphical user interface (GUI), and a database of applications and system profiles to fine tune a user's computer system to the requirements of the software application and thus, increase the performance of the applications running on the computer system.

The present invention's intelligent memory enables software applications to operate at maximum speeds through the acceleration of context switching and I/O interfacing. The acceleration of context switching includes software-based acceleration of application programs, processes-based caching acceleration of application programs, real-time code modification for increased performance, and process-specific multiprocessing for increased performance. The acceleration of I/O interfacing includes memory access acceleration and digital-to-analog (D/A) conversion acceleration.

It is a major objective of the present invention, through the accelerations mentioned above, and as will be described in detail below, to provide a reduced- cost solution for Intel® processor-based, IBM™ compatible personal computers (PCs), running the Windows 95/98™ or Windows NT™ operating system, which currently require a central processor as well as special purpose processors. This objective is illustrated by juxtaposing FIG. 1 and FIG. 2.

Figure 1:
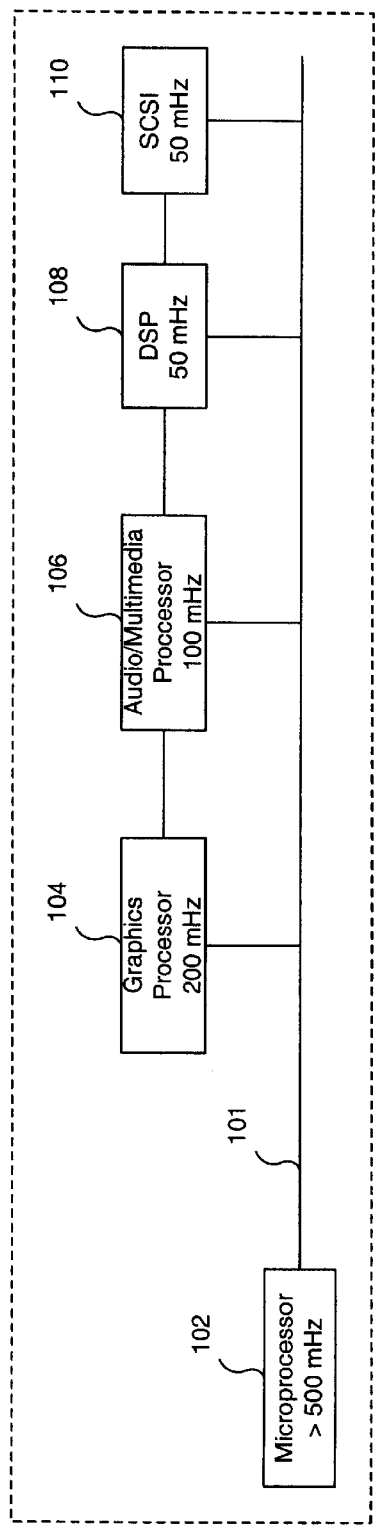
FIG. 1 is a block diagram of a conventional personal computer circuit board (i.e., motherboard)

Referring to FIG. 1, a (simplified) block diagram of a conventional PC motherboard 100 is shown. Motherboard 100 includes a microprocessor 102 which typically operates at a speed of at least 500 Megahertz (MHZ), a special graphics processor (i.e., graphics card) 104 which typically operates at a speed of at least 200 MHZ, and an audio or multimedia processor 106 (e.g., a sound card) which typically operates at a speed of at least 100 MHZ. The motherboard 100 also includes a digital signal processing (DSP) card 108 and a small computer system interface (SCSI) card 110, both of which typically operate at a speed of at least 50 MHZ. As will be apparent to one skilled in the relevant art(s), all of the components of the motherboard 100 are connected and communicate via a communication medium such as a bus 101.

A PC equipped with motherboard 100 utilizes the plurality of special- purpose cards (e.g., cards 104, 106, 108, and 110) to communicate with different I/O devices and to speed-up processing during the course of executing certain software applications. Without the presence of these special-purpose cards, the OS is required to switch between running a software application and running an I/O device (e.g., graphics driver) connected to the PC, which the application is dependent upon for proper execution. Most operating systems, however, are not capable of doing this (context) switching at a speed fast enough to satisfy PC users who demand "quick" response times from their computer systems. Real- time operating systems, such as TrueFFS for Tornado™ provided by Wind River Systems of Alameda, California, offer such fast switching. However, such real-time operating systems are "high-end" products not within the grasp of average PC users running the Windows 95/98™ or Windows NT™ operating systems. Thus, the need for special-purpose cards represents added expenses for the PC user.

Figure 2:
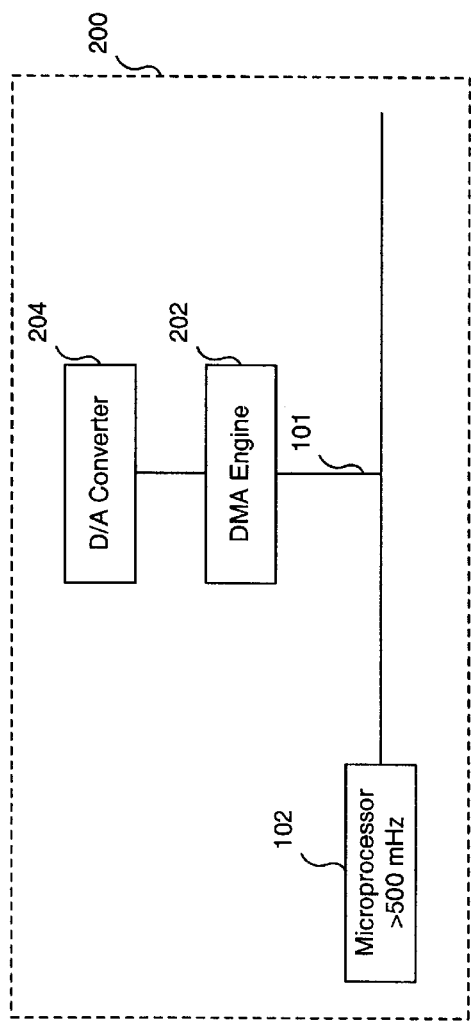
FIG. 2 is block diagram of a conventional personal computer motherboard simplified according to an embodiment of the present invention.

Referring to FIG. 2, a block diagram of a PC motherboard 200, simplified according to an embodiment of the present invention, is shown. Motherboard 200, when juxtaposed to motherboard 100 (as shown in FIG. 1), reveals that it includes solely the microprocessor 102, a direct memory access (DMA) engine 204, and a D/A converter 204, which are connected and communicate via bus 101. The DMA engine 204 can be any component (e.g., a dumb frame buffer) that allows peripherals to read and write memory without intervention by the CPU (i.e., main processor 102), while the D/A converter 204 allows the motherboard 200 (and thus, the PC) to connect to a telephone line, audio source, and the like. The simplified motherboard 200, as will become apparent after reading the description below, is made possible by the insertion and use of the present invention's intelligent memory system. Motherboard 200 illustrates the how the present invention can displace special-purpose computing systems to yield the PC-user a better price-to-performance ratio.

The present invention, as described herein, can eliminate "minimum system requirements" many software vendors advertise as being needed to run their products. In one embodiment, the intelligent memory of the present invention can come pre-packaged for specific hardware and/or software configurations. In another embodiment, the present invention may come as a plug in software or hardware component for a previously purchased PC.

Several existing products attempt to make the entire computer system more efficient. That is, some products attempt to balance the CPU power more evenly and others attempt to eliminate operating system waste of resources. These schemes can generally be described as attempting to divide the computer system's resources in a "fair" fashion. That is, the existing optimizing software products seek to balance resources among all processes.

The present invention, however, is intended for the "unfair" distribution of a systems resources. That is, the resources are distributed according to the wishes of the user (which are entered in a simple, intuitive fashion) at run-time. This is done via a performance table, where the processes at the head of the table are "guaranteed" to get a larger portion of system resources than processes lower in the table.

The present invention is described in terms of the above examples. This is for convenience only and is not intended to limit the application of the present invention. In fact, after reading the following description, it will be apparent to one skilled in the relevant art(s) how to implement the following invention in alternative embodiments. For example, the intelligent memory can be implemented using strictly software, strictly hardware, or any combination of the two.

Furthermore, after reading the following description, it will be apparent to one skilled in the relevant art(s) that the intelligent memory system, method, and computer program product can be implemented in computer systems other than Intel® processor-based, IBM compatible PCs, running the Windows 95/98™ or Windows NT™ operating systems. Such systems include, for example, a Macintosh® computer running the Mac® OS operating system, the Sun® SPARC® workstation running the Solaris® operating system, or the like. In general, the present invention may be implemented within any processing device that executes software applications, including, but not limited to, a desktop computer, laptop, palmtop, workstation, set-top box, personal data assistant (PDA), and the like.

II. System Architecture

Figure 3:
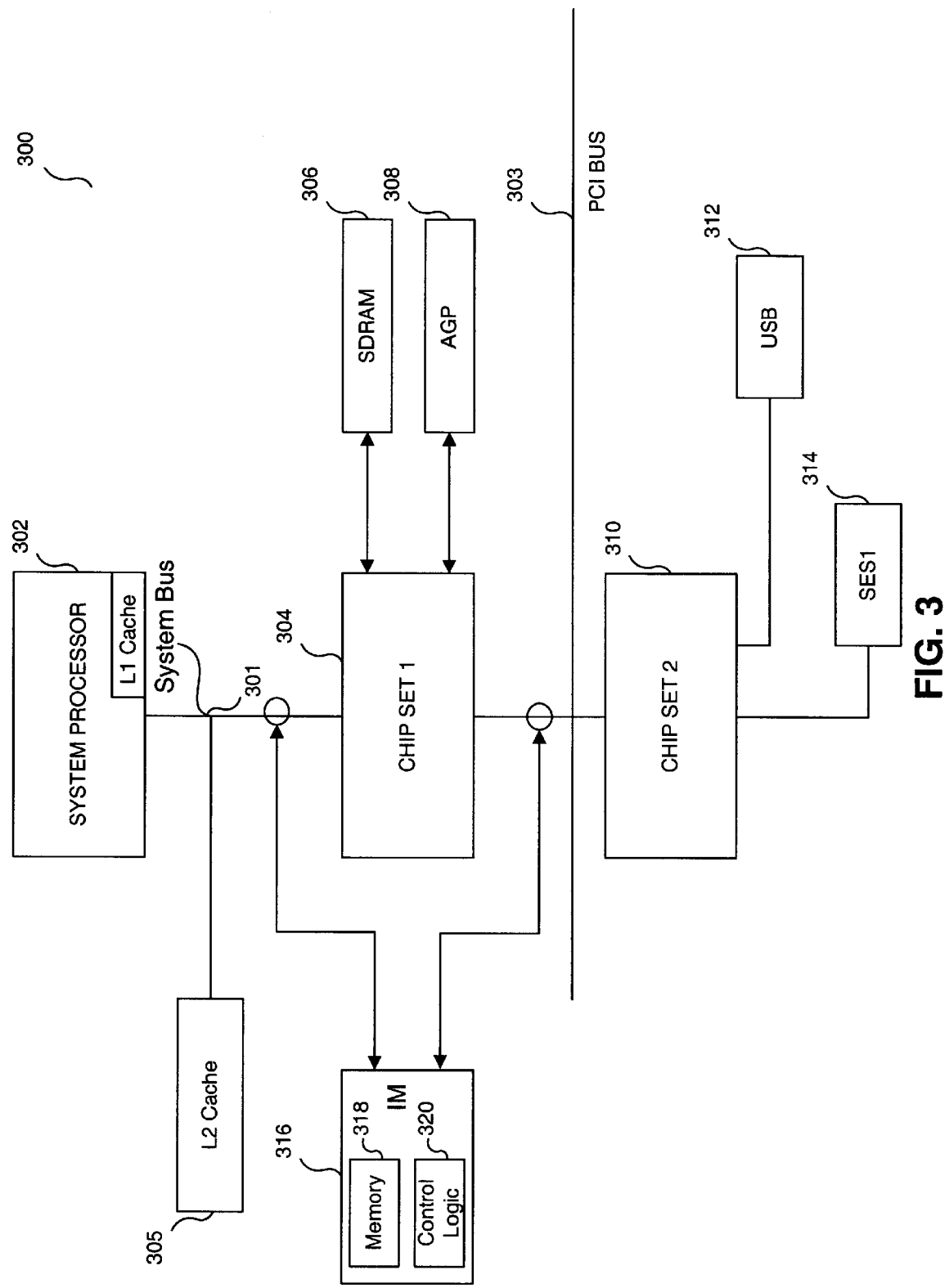
FIG. 3 is a block diagram illustrating the operating environment of the present invention according to an embodiment.

Referring to FIG. 3, a block diagram (more detailed than FIGS. 1 and 2) illustrating a motherboard 300, which is an operating environment of an embodiment of the present invention, is shown. Motherboard 300 is a conventional PC motherboard modified according to the present invention. Motherboard 300 includes a system processor 302 that includes a level one (L1) cache (i.e., primary cache), and a separate level two (L2) cache 305 (i.e., a secondary external cache). Motherboard 300 also includes a first chip set 304, which is connected to a Synchronous Dynamic random access memory (SDRAM) chip 306 and an accelerated graphics port (AGP) 308. All of the above-mentioned components of motherboard 300 are connected and communicate via a communication medium such as a system bus 301.

Further included in motherboard 300 is second chip set 310 that is connected and communicates with the above-mentioned components via a communication medium such as a PCI bus 303. Connected to the second chip set 310 is a universal serial bus (USB) 312 and SCSI card 314. All of the above-mentioned components of Motherboard 300 are well known and their functionality will be apparent to those skilled in the relevant art(s).

The present invention, however, also includes an intelligent memory 316 (shown as "IM" 316 in FIG. 3). As indicated in FIG. 3, the IM 316 has access to both the system bus 101 and PCI bus 303 which allows, as will be explained below, both context switching and I/O interfacing-based accelerations. The IM 316 includes a configurable and programmable memory 318 with intelligent control logic (i.e., an IM processor) 320 that speeds execution of application software without the need for special processor cards as explained above with reference to FIGS. 1 and 2. The functionality of the IM 316 is described in detail below.

While the configurable and programmable memory 318 and the intelligent control logic 320 are shown as one component 316 in FIG. 3, it will be apparent to one skilled in the relevant art(s) that they may physically be, in an alternative embodiment, two separate components.

Figure 4:
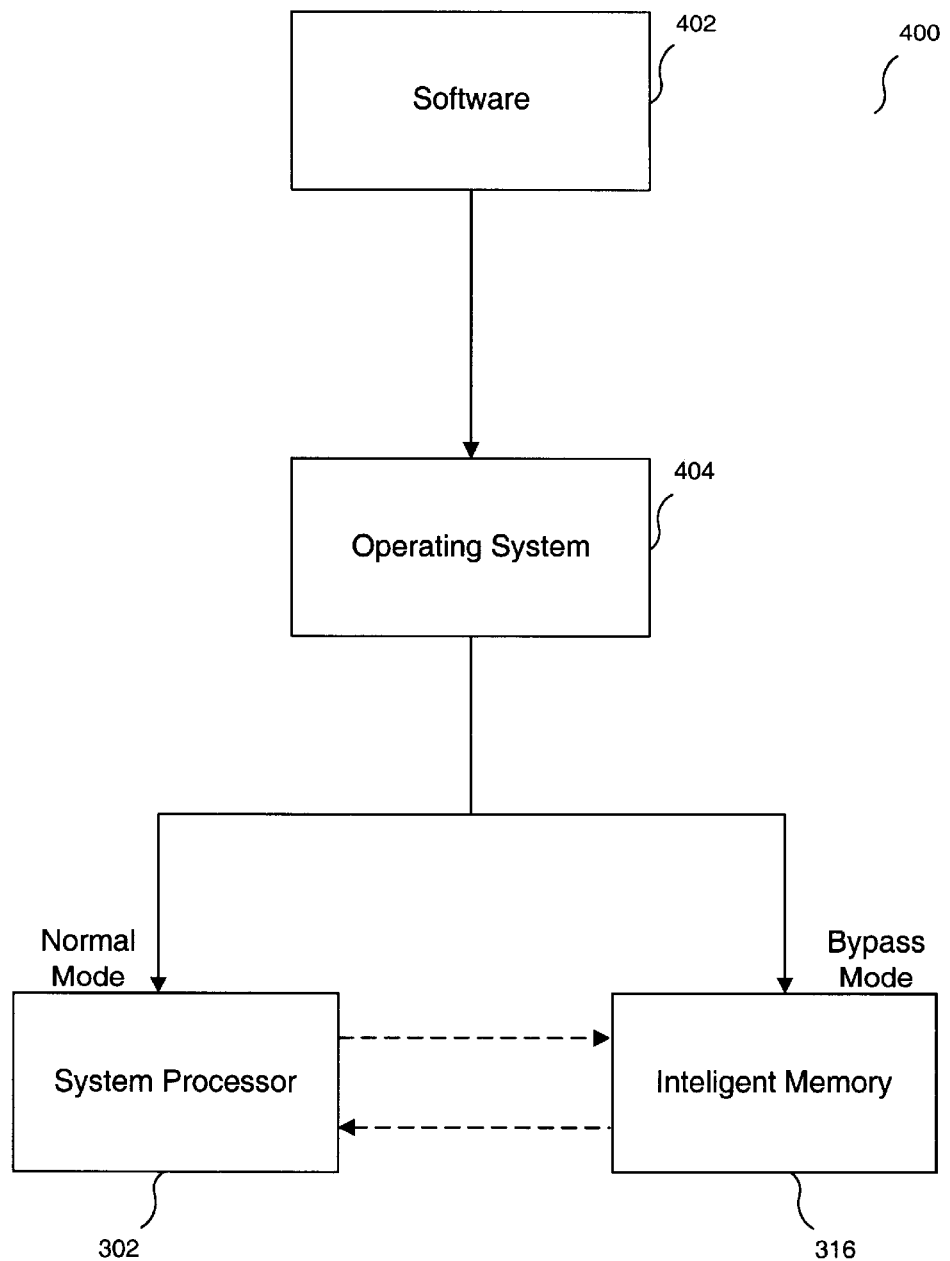
FIG. 4 is a flow diagram representing a software application executing within the environment of the present invention.

Referring to FIG. 4, a flow diagram 400 representing a software application executing within the environment of the present invention is shown. That is, a software application 402 can be made to run faster (i.e., be accelerated) on a PC modified by the presence of the IM 316 (as shown, for example, in FIG. 3). Flow diagram 400 illustrates the software application 402 running on top of a PC's operating system 404 in order to execute. In an embodiment of the present invention, the software application 402 may then be run in one of two modes. The first mode is "normal" mode where the system processor 302 functions as a conventional processor in order to execute the application. The second mode, according to the present invention, is a "bypass" mode where the IM 316 interacts with the system processor 302 in order to accelerate the execution of the software application 402. The acceleration and interaction of the bypass mode, as performed by the IM 316, is described in more detail below.

III. System Operation

A. Dataflow

Figure 5:
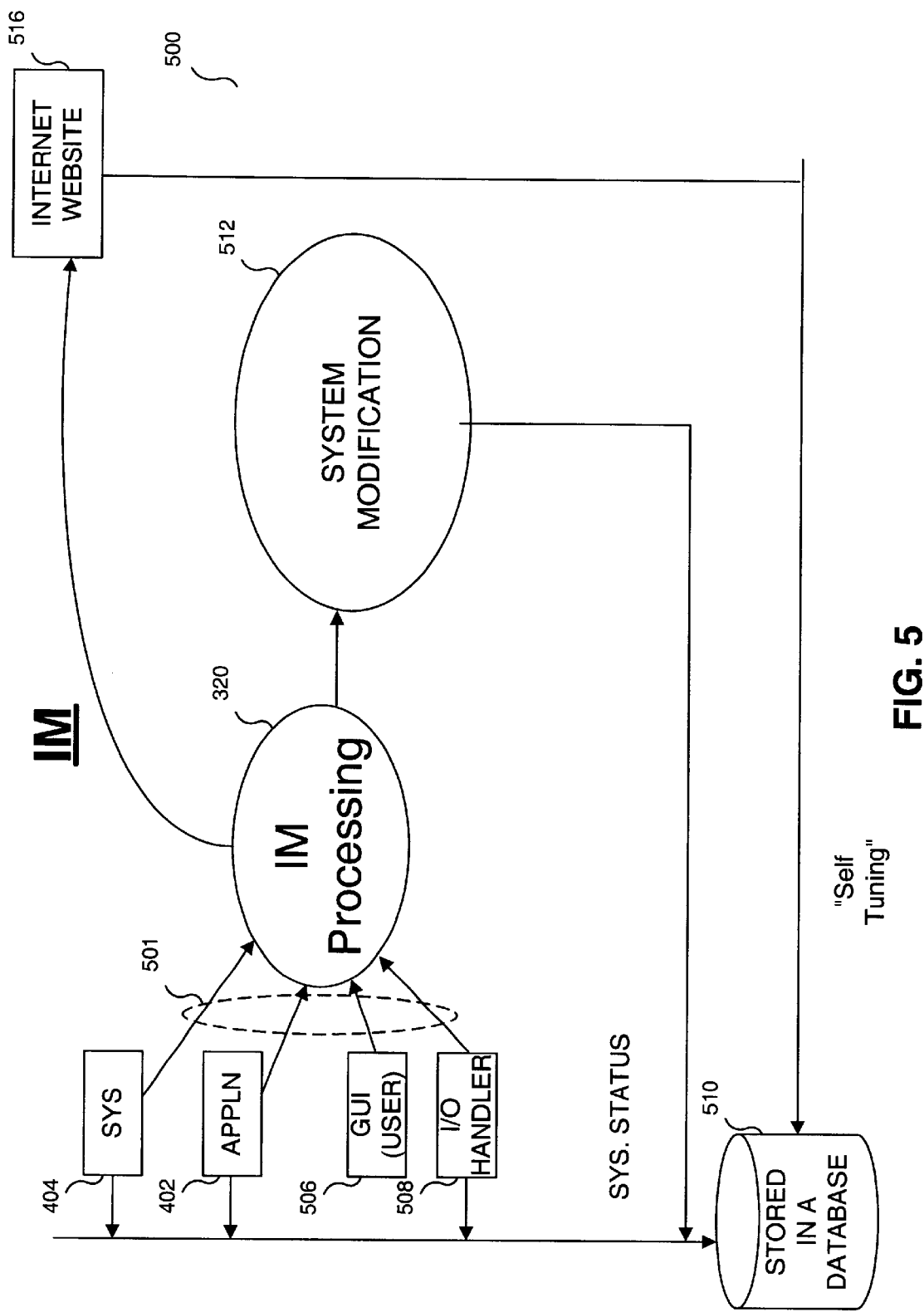
FIG. 5 is a flow diagram illustrating the overall operation of the present invention.

Referring to FIG. 5, a dataflow diagram 500 illustrating the overall operation of the IM 316 is shown. The IM 316 functions by taking inputs 501 from: (1) the OS 404; (2) the software application(s) 402 being accelerated; (3) the user via a GUI 506; and (4) an I/O handler 508 located on the PC. The four inputs are processed at run-time by the IM processor 320 in order to affect system modifications 512. Once the modifications 512 are made, the IM 316 receives system status in order to monitor the progress of the running software application 402. The system status information, as explained in detail below, will be used by the IM processor 320 to determine if additional system modifications 512 will be necessary in order to accelerate the software application 402 according to the wishes of the user (i.e, input from GUI 506).

In an embodiment of the present invention, a database 510 collects the inputs 501 and the system status information so that a history of what specific modifications 512 result in what performance improvements (i.e., accelerations) for a given software application 402. This allows the IM 316 to become "self-tuning" in the future when the same software application 402 is run under the same system conditions (i.e., system status). Further, by collecting the history of the modifications that increase performance, software vendors may examine database 510 in the process of determining the enhancements to implement in new releases of software applications 402.

In an embodiment of the present invention, the database 510 would initially contain, for example, known characteristics for the ten most-popular operating systems and ten most-popular software applications. For example, the database 510 may include information indicating that if the application 402 is the Microsoft™ Word word processing software, that the screen updates and spell-checker functions are more important to accelerate than the file-save function. As will be apparent to one skilled in the relevant art(s), the physical location of the database 510 is unimportant as long as the IM 316 may access the information stored within it without adding delay that would destroy any performance benefit achieved by IM processing 320.

Aside from collecting the inputs 501 and the system status information so that a history of what modifications 512 yield performance improvements, the database 510 also contains specific application and system information to allow the control logic (i.e., IM processor 320) of IM 316 to make initial system modifications 512. The information included in the database 510 can be categorized into: (1) system status information; and (2) application information. While one database 510 is shown in FIG. 5 for ease of explanation, it will be apparent to one skilled in the relevant art(s), that the present invention may utilize separate application and system databases physically located on one or more different storage media.

The system information within the database 510 contains information about the specific configuration of the computer system. In an embodiment of the present information, some of this information is loaded at setup time and stored in a configuration file while other information is determined every time the bypass mode of the IM 316 is launched. The system information within the database 510 can be divided into four organizational categories—cache, processor, memory, and peripheral. These four organizational categories and the classes of system information within database 510, by way of example, are described in TABLES 1A–1D, respectively.

TABLE 1A

| CACHE OR-GANIZATION CLASS OF INFOR-MATION | DESCRIPTION |
| --- | --- |
| Cache Level | The levels in the cache (1,2,3,4) |
| Location | The location of the cache level (e.g., Processor_Die, Processor_Module, System_Bus IO_BUS) |
| Size | Indicates the cache size for the particular level (a size field of 0 indicates the cache level is non existent) |
| Protocol | Indicates which cache protocol is used at which level. The cache protocol consists of the transition states of the cache (MOESI protocol). The MOESI (Modified, Owned, Exclusive, Shared, Invalid) state transition diagram determines the policy the cache level uses to handle blocks. In this field the value would indicate the transitions used. NOTE: The state transitions are usually unique to a particular processor model, but this field is included in case there are any issues. |

TABLE 1A-continued

| CACHE OR-GANIZATION CLASS OF INFOR-MATION | DESCRIPTION |
| --- | --- |
| Associativity | Indicates the associativity of the cache level. The field indicates the way of the associativity. A value of 0 indicates a fully associative cache organization. |
| Replacement Strategy | Indicates which block will be removed to make room for a new block. This field indicates which type of strategy is used. Examples of replacement strategies are (1) LRU (least recently used) (2) FIFO (first in first out) (3) Random. There are also modified versions of these algorithms. |
| Cache Type | A spare field to indicate any special types of caches which may be required. |

The fields, presented in TABLE 1B, indicate the different attributes of the processor 302 stored within the database 510. It should be noted that the differences in processors may be indicated by vendor and model number, but these variations are indicated to allow the software to make decisions based on processor architecture rather than model numbers.

TABLE 1B

| PROCESSOR ORGANIZA-TION CLASS OF INFORMA-TION | DESCRIPTION |
| --- | --- |
| Clock Speed | Indicates the clock speed of the processor. There are sub-fields to indicate the clock speeds for the CPU, and the different cache level interfaces. |
| Superscalar | Indicates the type of superscalar organization of the central processing unit. |
| Vendor | Indicates the vendor and model number of the processor. |
| Special Instructions | Indicates the availability and types of special instructions. |

This section of the database, as shown in TABLE 1C, indicates the structure of the memory sub-system of the PC.

TABLE 1B

| MEMORY ORGANIZA-TION CLASS OF INFORMATION | DESCRIPTION |
| --- | --- |
| Pipelining | Indicate the level of pipelining of the accesses to memory. It also indicates the pipelining of reads and writes. |
| Bus protocol | Indicates the type of bus used to connect to main memory |
| Types | Indicates the type of memory the main memory is composed of. |
| Vendors | Lists the vendors and model numbers of the main memory modules. There are also sub-fields indicating the vendor and model of the memory chips. |
| Speed | Indicates the speed of the memory sub-system. |

This section of the database 510, as shown in TABLE 1D, contains information on the peripheral organization and type of the I/O sub-system of the PC.

TABLE 1D

| PERIPHERAL ORGANIZATION CLASS OF INFORMATION | DESCRIPTION |
| --- | --- |
| I/O Bus Type | Indicates the types of busses used to connect to the I/O peripherals (e.g., PCI, AGP of ISA) |
| I/O Control Mechanism | Indicates the type of control mechanism the I/O uses. For most peripherals this is memory mapped registers, but some PCs use other types of control mechanisms. These may be I/O mapped control registers or memory queues. |
| Special Purpose Functions | Indicates some special functions performed by the I/O. The actual value of this field depends on the vendor of the I/O peripheral. |
| Non-cache Regions | Indicates the non-cacheable regions of the memory space used by the I/O sub-system. |
| Control Libraries | Indicates the locations and types of the drivers of the I/O peripherals. |

The system information within database 510 can be populated with such system configuration data using any system manager function (e.g., reading the system's complementary metal oxide semiconductor (CMOS) chip, reading the Registry in a Windows 95/98™ environment, etc.).

The application information within database 510 contains the performance related information of specific applications 402. If the user selects any of these applications 402 to accelerate, the IM control logic 320 will retrieve this information from the database 510 to optimize the application 402. The classes of application information within database 510, by way of example, are described in TABLE 2.

TABLE 2

| CLASS OF INFORMATION | DESCRIPTION |
| --- | --- |
| Page Usage Profile | The profile of the virtual memory page accesses. The page location and frequency of access and type of access are contained in this section. |
| Branch Taken Profile | The taken / not taken frequency of each branch is mapped into the database. The application function associated with the branch is also mapped to the branch location. |
| Superscalar Alignment Profile | The application database also contains information about the potential for superscalar re-alignment for different sections of code. The analysis program looks at long segments of code for superscalar realignment opportunities and indicates these places and the optimization strategy for the code sequence. |
| Data Load Profile | The database contains information about the frequency and location of data accesses of the application. |
| Non-cache Usage Profile | The database contains information on the frequency and location of non-cached accesses |
| I/O Usage Profile | The database contains information on the frequency and location of Input Output accesses |
| Instruction Profile | The frequencies of different types of instructions are stored in the database. These are used to determine the places where the instructions can be replaced by more efficient instructions and/or sequences. |

The application information within database 510 can be populated with such data using based on industry knowledge and experience with the use of particular commercial software applications 402 (as explained with reference to FIG. 5 below).

Further, one embodiment of the present invention envisions that each computer system equipped with an IM 316 can be linked to a central Web site 516 accessible over the global Internet. The Web site 516 can then collect information from many other computer systems (e.g., via a batch upload process) and further improve each systems' database 516. That is, a wider knowledge base would be available for determining what specific modifications yield specific performance improvements (i.e., accelerations) for a given software application 402.

In an embodiment of the present invention, an intelligent memory service provider can provide means, via the Web site 516, for users to download updated revisions and new (AI) algorithms of the IM control logic 320 as well as new and updated (system and/or application) information for their local database 510. Information from all users is updated to a central site and this information is used to determine the best possible optimization strategies for increasing performance. The strategies can then be downloaded by users. The result is an ever increasing database of optimization strategies for an ever widening number of configurations.

In an alternative embodiment, users can also obtain a CD ROM (or other media) that contain the latest optimization strategies. Different software manufacturers may also want to distribute specific strategies for their specific applications 402 and thus gain a competitive advantage over their competitors. Other data collection and distribution techniques, after reading the above description, will be apparent to a person skilled in the relevant art(s).

B. Methodology

Figure 6:
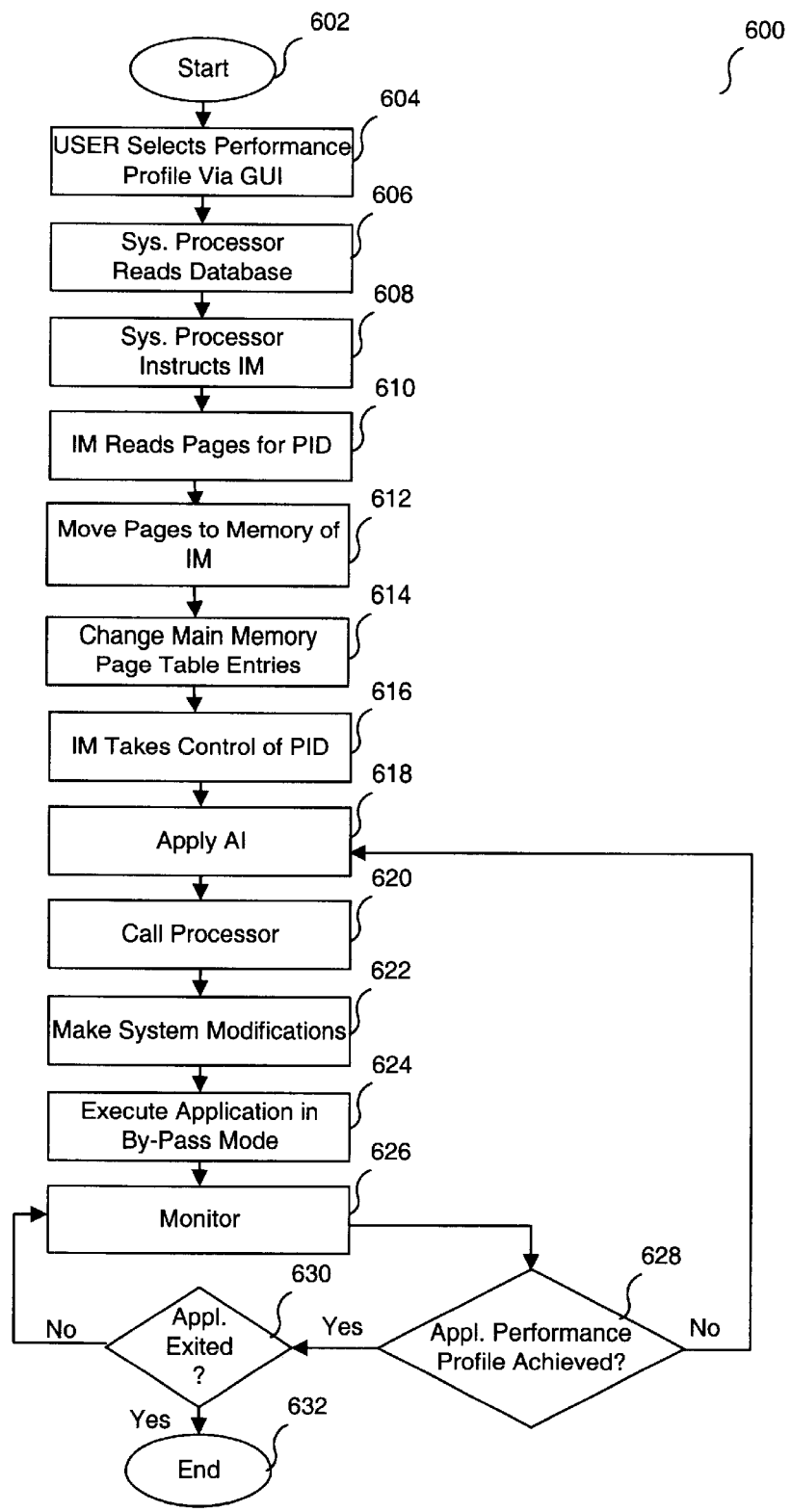
FIG. 6 is a flowchart detailing the operation of the intelligent memory system according to an embodiment of the present invention.

Referring to FIG. 6, a flowchart 600 detailing the operation of a computer system (such as system 300) containing the IM 316 is shown. It should be understood that the present invention is sufficiently flexible and configurable, and that the control flow shown in FIG. 6 is presented for example purposes only. Flowchart 600 begins at step 602 with control passing immediately to step 604. In a step 604, a user, via the GUI 506, selects the software application 402 whose performance they would like to modify and the performance profile they would like the application 402 to achieve. This selection can be made from a list of running process identification numbers (PID).

In one embodiment of the present invention, GUI 506 may be separate window running within the OS of the PC, that provides the user with an interface (radio buttons, push buttons, etc.) to control and obtain the advantages of the intelligent memory 316 as described herein. In another embodiment, the GUI 506 may be configured as an embedded control interface into existing software applications.

In a step 606, the system processor 404 reads the database 510 to obtain the application- and system-specific information needed in order to affect the user's desired performance profile selected in step 604. In a step 608, the system processor then instructs the IM 316 to accelerate the process selected by the user in step 604. The PID of the process is used by the system processor to identify the particular software application 402 to the IM 316.

In a step 610, the IM 316 goes through page table entries in main memory (i.e., in SDRAM 306) for the software application 402 pages using the PID. In a step 612, the pages are moved to the internal memory 318 of the IM 316. In this fashion, the IM 316 functions as a "virtual cache." In an example embodiment of the present invention, the pages of the application 402 can be stored to the IM 316 in an encrypted fashion to protect the data stored in the IM 316.

In a step 614, the page table entries in the main memory for the PID are changed to point to the internal memory 318 of the IM 316. At this point, the internal memory 318 of the IM 316 contains pages for only the application(s) 402 represented by the PID(s) chosen by the user. This is unlike the main memory, which contains pages for all of the currently running processes.

In a step 616, the IM 316 takes control of the application 402, employing the necessary modifications to accelerate it. Now, when the system processor 302 access main memory during the execution of the application 403, the main memory's address space for the application 402 will point to the IM 316. This allows the IM 316 to operate invisibly from the system processor 302.

In a step 618, the artificial intelligence (AI) (or control logic) contained within the IM processor 320 is applied to the inputs of step 604 and 606 in order to derive the specific system modifications 512 necessary in order to achieve the desired performance profile. Then, in a step 620, the processor is called to update the hardware devices table within the PC and the state at which they boot up (i.e., device enabled or device disabled). The processor does this by reading the device type and its function.

In a step 622, the system modifications determined in step 618 are applied (e.g., modifying OS 404 switches and hardware settings) as indicated in dataflow diagram 500 (more specifically, 512). Then, in a step 624, the specific application 402 is allowed to continue and is now running in the bypass mode (as shown and described with reference to FIG. 3). In a step 626, the IM 316 begins to monitor the progress of the running software application 402. In a step 628, the monitored system status information is used to determine if additional modifications 512 will be necessary in order to accelerate the software application 402 according to the wishes of the user (i.e, inputs from GUI 506 in step 604). If the desired performance profile is not achieved, steps 618 to 626 are repeated as indicated in flowchart 600. If the desired performance profile is achieved, step 630 determines if the application 402 is still executing. As indicated in flowchart 600, steps 626 to 630 are repeated as the application 402 runs in bypass mode until its execution is complete and flowchart 600 ends as indicated by step 632.

As will be apparent to one skilled in the relevant art(s), in an alternative embodiment of the present invention, more than one application 402 can be selected for acceleration in step 604.

C. Graphical User Interface

As mentioned above, the GUI 506 accepts a users input to determine the performance profile and process modifications 512. The GUI 596 can accept user inputs through an application performance table 700 shown in FIGS. 7A–C.

The application performance table 700 is a means of simultaneously displaying relative application 402 performance and accepting the input from the user as to which applications 402 the user wants to accelerate. The application performance table 700 works as follows:

Initially the table 700 is a list of applications, while the initial table is being displayed (i.e., in normal mode), the IM 316 is determining the relative performance of the applications as shown in FIG. 7A. The relative performance is not just CPU usage, but a combination of the relative usage of all system resources. In bypass mode, the IM 316 would then rearranges the table with the applications listed in the order of their relative performance as shown in FIG. 7B.

The user can look at the listing of the relative performance and determine which application they would like to accelerate. The user can then select an application 402 with, for example, a mouse and move the application to a higher position in the table (i.e., "dragging and dropping"). Referring to FIG. 7C, the user has moved Application 8 to the top of the list indicating that they would like application 8 to be the fastest (that is, Application 8 should be allocated the most system resources). The IM 316 will then reassign the system resources to ensure that Application 8 receives the most system resources. Accordingly, the applications 402 that have been moved down the application performance table 700 will receive less system resources when modifications 512 are made.

The present invention's use of the application performance table 700 has several advantages over previous performance control technology as summarized in TABLE 3.

TABLE 3

| CATE-GORY | PREVIOUS TECHNOLOGY | TABLE 700 ADVANTAGE |
|---|---|---|
| Intuitive Display | Displayed actual numbers user had to figure out which resource were a problem | Displays relative performance user can see immediately which applications have problems |
| Desired Performance Input | User can change certain OS parameters but these may not be performance bottlenecks | Use indicates required performance, software determines which parameters to change and by how much |
| Parameter Changes | Only few options in changing few parameters | Software can make many subtle changes in many parameters |
| Feedback | No feedback | User can see immediate feedback of software |

It should be understood that the GUI 506 screen shots shown in FIG. 7 are presented for example purposes only. The GUI 506 of the present invention is sufficiently flexible and configurable such that users may navigate through the system 500 in ways other than that shown in FIGS. 7A–C (e.g., icons, pull-down menu, etc.). These other ways to navigate thought the GUI 506 would coincide with the alternative embodiments of the present invention presented below.

In an alternative embodiment of the present invention, the GUI 506 would allow the user to select differing levels of optimization for an application 402 (e.g., low, normal, or aggressive).

In an embodiment of the present invention, a multi-threaded application 402 can be selected for acceleration. For example, an application 402 can have one initial process and many threads or child processes. The user may select any of these for acceleration depending on which function within the application they desire to accelerate.

Further, in an embodiment of the present invention, a user can select processes within the OS 404 to accelerate (as opposed to merely executing applications 402). This would allow a general computer system performance increase to be obtained. For example, the Windows NT™ and UniX™ operating systems have daemon processes which handle I/O and system management functions. If the user desires to accelerate these processes (and selects them from the a process performance table similar to the application performance table 700), the present invention will ensure that these processes will have the most resources and the general system performance will be accelerated.

IV. Accelerations

A. Specific Accelerations

The control that the IM 316 exhibits over the application 402 is managed by the IM processor 320. The IM processor 320, taking into account the four inputs explained above with reference to data flow diagram 500, and using the database 510, decides what OS 404 switches and hardware settings to modify in order to achieve the acceleration desired by the user. The general approach of the present invention is to consider the computer system, the application 402 targeted for acceleration, the user's objective, and the I/O handler 508. This run-time approach allows greater acceleration of application 402 than possible with design-time solutions. This is because design-time solutions make fixed assumptions about a computer system which, in reality, is in continual flux.

The three types of classes upon which the IM processing 320 of the present invention operates on to make modification 512 are listed in TABLE 4.

TABLE 4

| Inputs | Execution | Monitoring and Feedback |
| --- | --- | --- |
| GUI & DB | System | None |
| Hardware Fixed | Special Process in IM 316 | Hardware monitoring |
| GUI & DB | Special Process in IM 316 | Chip-specific Instruction |

The control logic 320 uses the information within database 510 and determines which strategy to use to increase the performance of the system (i.e., the application(s) 402 executing within the computer system). The optimization strategies employed by the IM 316 include, for example, process virtual memory, application optimization, multiprocessor control, and system strategies. Specific examples of each type of optimization strategy are presented in TABLES 5–8, respectively.

TABLE 5

| PROCESS VIRTUAL MEMORY STRATEGIES | DESCRIPTION |
| --- | --- |
| Cache Mapping Efficiency | The location of the process pages are changed to increase the cache hit rate for that processor. This is called page coloring. |
| Make pages Non-removable | The process pages are made non-moveable so that the optimal placement will not be destroyed. This is done by altering the attributes of the page in the Page Table Entry. |
| Change TLB to Match Process | This strategy involves the replacement of TLB entries to ensure that the target process has all (or as many as possible) entries cached in the TLB cache. The strategy |
| Process Page Prefetch | This means the process page is fetched into memory before it is needed. For optimum performance all the processes pages are stored in memory and made non-removable. |

Application optimization strategies, shown in TABLE 6, allow individual applications are also optimized. The strategies involve modifications to actual code and placement of code in the application. The final code and placement is determined by the processor type and memory organization.

TABLE 6

| APPLICATION OPTIMIZATION STRATEGIES | DESCRIPTION |
| --- | --- |
| Loop Modification | In this strategy the instruction sequence in a loop is modified to be optimal for the prefetch and superscalar organization of the processor. The cache and memory organization is also taken into account during the loop optimizations. |
| Instruction translation | In this strategy the code of the application is translated to code which is optimal for the type of processor in the system. |

TABLE 6-continued

| APPLICATION OPTIMIZATION STRATEGIES | DESCRIPTION |
| --- | --- |
| Code placement | The location of the code in memory is also modified for three reasons. 1) Modification of the code frequently means the code sequence changes length so that the code sequence has to be moved for optimal placement. 2) Many applications have unnecessary space in them because of linker inefficiencies. The code can be compacted to take up less room in memory, hence the performance can be increased. 3) The code placement is also changed to be optimal for the cache and memory organization of the system. |

Multiprocessor control strategies, shown in TABLE 7, control the assignment of processes and tasks to different processors in an multiprocessing system. The operating system tries to balance tasks in a multiprocessing system which results in inefficiencies in task execution.

TABLE 7

| MULTI-PROCESSOR CONTROL STRATEGIES | DESCRIPTION |
| --- | --- |
| Select processor for process | The main processor optimization is to fix the process to be executed on only one processor. |

System strategies, shown in TABLE 8, are "miscellaneous" strategies for increasing the performance of the application. These concern setting operating system switches which affect how the operating system handles the application. As will be apparent to one skilled in the relevant art(s), many performance control software applications currently available use these two strategies exclusively.

TABLE 8

| SYSTEM STRATEGIES | DESCRIPTION |
| --- | --- |
| Change process priorities | In this strategy the process priority is changed to a higher value. |
| Modify Time Slice | In this strategy the time slice allocation for a process is increased. |

B. General Strategies

As explained above, intelligent memory 316 acceleration consists of memory 318 with special mapping. Ordinary L2 caches are based on address mapping. This mapping is a trade-off to reduce cost and complexity. The mapping is based on the location of the cache block in memory. In order to reduce costs even further, several different memory blocks are assigned the same cache location. This means a specific process has to share cache space with other processes. When the OS 404 switches between processes, there is a period of high cache miss rate. Thus, in an embodiment of the present invention, in order to reduce the latency and increase throughput of selected processes, these processes are entirely mapped in the IM 316. Even processes which occupy regions in memory which would have used the same block in the address mapped cache can share the IM 316. Depending on the memory hierarchy organization, the IM 316 can be described as an intelligent cache or reserved memory.

Real-time code modification consists of changing the instruction sequence to increase the performance. There are many well-known techniques for post-compile code modification to increase performance as described in Kevin Dowd, *High Performance Computing*, ISBN 1565920325, O'Reilly & Associates 1993 (USA), which is hereby incorporated by reference in tis entirety. These techniques, however, resolve performance problems at link time. This is because there are many difficulties in modifying the code in real time, such as re-calculating address offsets and re-targeting jumps. Because the present invention contains the entire process address space in intelligent memory 318, it can easily modify the code and change the locations for optimum efficiency.

Process-specific multiprocessing consists of executing specific processes on different processors. The main processor executes processes as usual, but selected processes are executed on a secondary processor. This is not the same as regular multiprocessing. This multiprocessing is done "in front of" the level-2 cache 305. In the present invention, the intelligent memory 318 has all the code locally and can determine which processor to run a particular process on. The memory 318 can also partition processors among asymmetric processor.

V. Client-Server Applications

In an alternative embodiment, a computer system which includes client-server software applications executing in a distributed fashion within a network is contemplated, whereby the present invention may be utilized.

As is well known in the computing arts, computer software applications are commonly implemented in accordance with a client-server model. In a client-server implementation a first executing software application (a "client") passes data to a second executing software application (a "server"). That is, a client-server model is a distributed system in which software is separate between server tasks and client tasks. A client sends requests to a server, using a protocol, asking for information or action, and the server responds. Further, there can be either one centralized server or several distributed ones.

In client-server model, the client software application typically executes, but is not required to, on a separate physical computer unit (possibly with different hardware and/or operating system) than the server software application.

The current invention specifies a user providing input in order to change the "performance profile" of the applications running on the computer system. That is, the user selects which applications/processes/threads run faster and which will run slower. It should be apparent to one skilled in the relevant art(s), after reading the above description, however, that the invention can also be applied to any "entity" which requires a specific performance profile.

For example, consider the case of where the computer system includes a client-server software application executing in a distributed fashion within a network. In such a case, the client-side program can be the "entity" that provides the selection inputs, and thus be considered the "user" as described and used herein. That is, the client can instruct the server, via the present invention (e.g., via application table 700), to accelerate some processes 402 and decelerate others. The difference would be that instead of the (human) user providing input via the GUI 506 (and, for example, by using application performance table 700), the client would select the performance profile via a remote procedure call (RPC).

As is well known in the relevant art(s), an RPC is implemented by sending a request message to the server to execute a designated procedure, using arguments supplied, and a result message returned to the caller (i.e., the client). There are various protocols used to implement RPCs. Therefore, in the present invention, the RPC would specify which application 402 the client would like the server process to accelerate. The same would be true for the processes running on the server side. That is, the server could indicate to the client, using the present invention, which processes (i.e., applications 402) to accelerate and which to decelerate.

To illustrate the above embodiment, consider the case of a video streaming application 402 executing over a network. Typically, the client would request that video be downloaded. The server would send the video and possibly a Java applet to view the video. Using the present invention, the server can also send instructions to the present invention (i.e., IM 316) to assign a larger percentage of total system resources to the Java applet. The result would be a smoother playback of the downloaded video. In contrast, without the present invention, the client would have no indication as to how to handle the data and/or the applet being downloaded. Thus, the video data stream (which is time sensitive) is treated, by the client, like any other data. The network containing the client and server may accelerate the downloading of the video, but the present invention allows the assignment of system resources to the data being downloaded. In other words, the server can indicate if the data requires a larger or smaller percentage of the client's system resources.

In addition to the above, in an alternative embodiment of the present invention, the client-server can also send specific acceleration database information along with the data in order to accelerate the processing of the data. Consider, for example, the RealPlayer® Internet media streaming software application, available from RealNetworks, Inc. of Seattle, Wash. In addition to data, the server can also send information stored in database 510 (as described above) so that the RealPlayer® application's performance is increased. Thus, the present invention allows a web server to differentiate itself from other servers that may be present in a network which simply carry data alone.

Further, in an alternative embodiment, the present invention can accept inputs from both a (human) user and a client-server (remote or local) program simultaneously. Consider, for example, the case where a user is running an application which is computation intensive (e.g., a Microsoft® Excel worksheet re-calculation). The user may then select this application to be assigned the most system resources (e.g., by using GUI 506). While the Excel application is executing, however, the user may decide to view video clips from the Internet. The server, as described above, will indicate (i.e., request) that the video applet get the most resources. But because the user has already selected the Excel process for getting the most resources, the present invention will apply the (AI) algorithms of the IM control logic 320 and database 510 inputs to provide both processes with the resources they need.

Conventional systems, in contrast, only allow the user to change the priority of the Excel application. There is no other functionality offered to a user that allows the acceleration of other processes. Thus, both the Excel application and video applet would be assigned the highest priority. This result defeats the purpose of changing the performance profile of the applications running on the computer system. In addition, accepting inputs from both the (human) user and remote processes gives the user some control over the assignment of resources via the application table 700. For example, in an embodiment, the user may select that a remote process only be allowed to use slots 4, 5, and 6 in the table 700 (see FIGS. 7A–C). This way, the remote process cannot take resources away from the processes the user wants accelerated. The system 500 as a whole, however, remains responsive to run-time demands for the allocation of resources.

VI. Example Implementations

Figure 8:
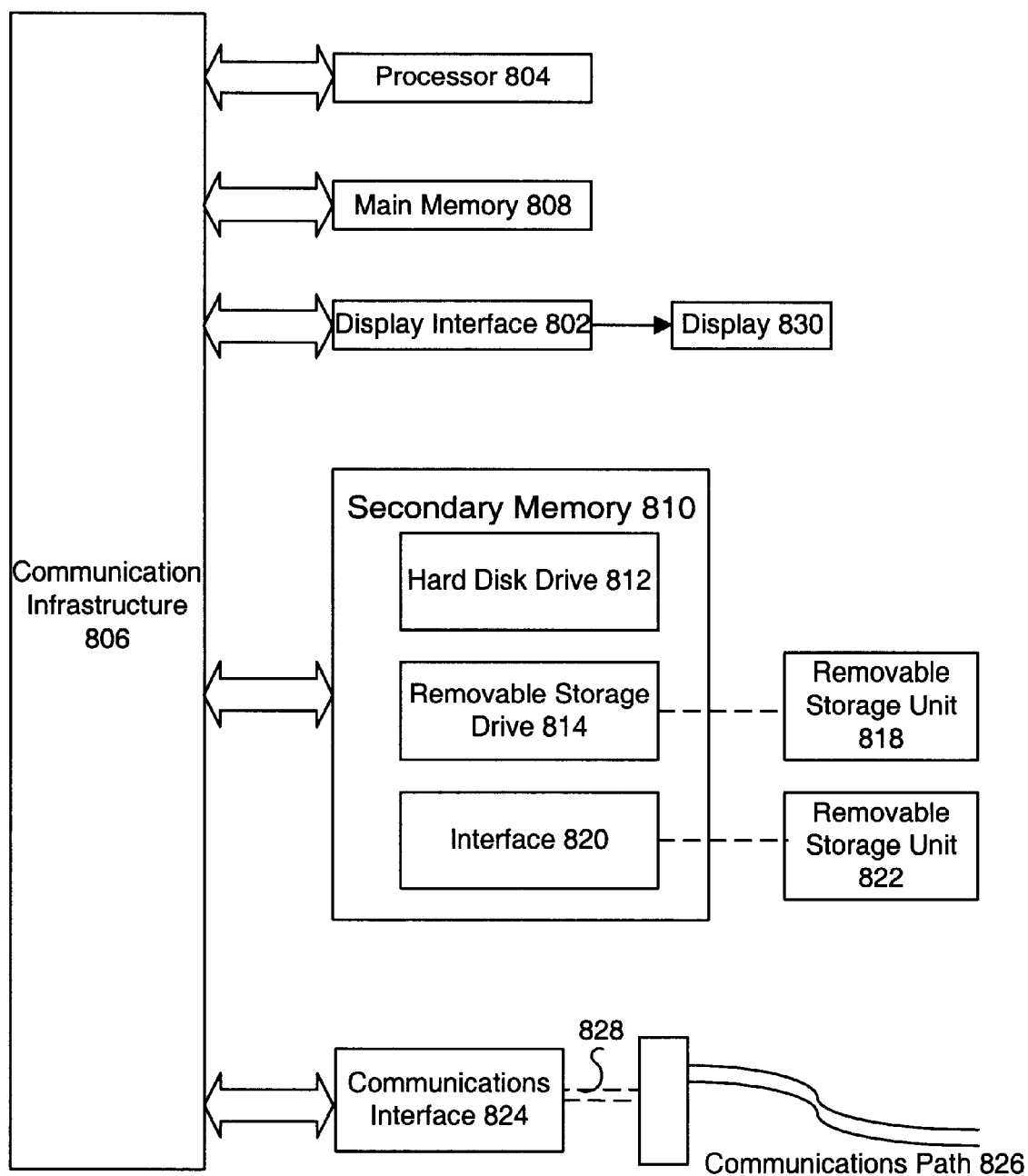
FIG. 8 is a block diagram of an exemplary computer system useful for implementing the present invention.

The present invention (i.e., system 500, the intelligent memory 316, or any part thereof) can be implemented using hardware, software or a combination thereof and can be implemented in one or more computer systems or other processing systems. In fact, in one embodiment, the invention is directed toward one or more computer systems capable of carrying out the functionality described herein. An example of a computer system 800 is shown in FIG. 8. The computer system 800 includes one or more processors, such as processor 804. The processor 804 is connected to a communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 800 can include a display interface 805 that forwards graphics, text, and other data from the communication infrastructure 802 (or from a frame buffer not shown) for display on the display unit 830.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Examples of communications interface 824 can include a modem, a network interface (such as an Ethernet card), a communications port, a PCM-CIA slot and card, etc. Software and data transferred via communications interface 824 are in the form of signals 828 which can be electronic, electromagnetic, optical or other signals capable of being received by communications interface 824. These signals 828 are provided to communications interface 824 via a communications path (i.e., channel) 826. This channel 826 carries signals 828 and can be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. These computer program products are means for providing software to computer system 800. The invention is directed to such computer program products.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software can be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for providing a user with increased application performance and functionality within a computer system, comprising:

(a) a graphical user interface, accessible via the computer system, for allowing the user to select an application executing on the computer system to accelerate;

(b) an application database that contains profile information on said application;

(c) a system database that contains configuration information about the computer system; and (d) an intelligent memory that comprises:

(i) control logic that uses said application database and said system database to determine a set of modifications that increase the performance of said selected application; and (ii) a memory that stores said application and allows said control logic to implement said set of modifications while said application is executing on the computer system;

whereby allowing said application to more fully utilize the processing capabilities of the processor within the computer.

2. The system of claim 1, wherein said set of modifications include at least one of the following:

(i) modifications to said application executing on the computer system;

(ii) modifications to an operating system running the computer system; and (iii) modifications to the hardware within the computer system.

3. The system of claim 1, where said graphical user interface comprises an application table illustrating the name of said application for the user to select.

4. The system of claim 1, wherein said intelligent memory is implemented by the processor and the memory of the computer system.

5. The system of claim 1, wherein said intelligent memory resides on the motherboard of the computer system and separated from the processor.

6. The system of claim 1, further comprising:

means for updating said application database and said system database.

7. The system of claim 1, wherein the computer system includes a network, and said application is a client-server software application executing in a distributed fashion over said network.

8. The system of claim 1, wherein said set of modifications include real-time code modifications to said application executing on the computer system.

9. A method for providing a user with increased application performance and functionality within a computer system, comprising the steps of:

(1) receiving an executing application input from the user via a graphical user interface;

(2) accessing an application database that contains profile information about said executing application, said profile information comprised of at least two application characteristics;

(3) accessing a system database that contains configuration information about the computer system;

(4) applying control logic that uses the information in said application database and said system database to determine a set of modifications that increase the performance of said selected application; and (5) applying said control logic to make said set of modifications whereby allowing said application to more fully utilize the processing capabilities of the processor within the computer.

10. The method of claim 9, wherein said set of modifications include at least one of the following:

(i) modifications to said application executing on the computer system;

(ii) modifications to an operating system running the computer system; and (iii) modifications to the hardware within the computer system.

11. The method of claim 9, wherein said executing application input is a process within the operating system executing on the computer system.

12. The method of claim 9, wherein said executing application input is a thread of an application executing on the computer system.

13. The method of claim 12, wherein said executing application input is a server-side program within said client-server software application executing in a distributed fashion on the computer system.

14. The method of claim 13, wherein said executing application input is a client-side program within said client-server software application executing in a distributed fashion on the computer system.

15. The method of claim 9, wherein said user is a client-side program of a client-server software application executing in a distributed fashion on the computer system.

16. The method of claim 9, wherein said user is a server-side program of a client-server software application executing in a distributed fashion on the computer system.

17. A computer program product comprising a computer usable medium having control logic stored therein for causing a computer to provide a user with increased application performance and functionality, said control logic comprising:

a first computer readable program code means for causing the computer to receive an executing application input from the user via a graphical user interface;

a second computer readable program code means for causing the computer to access an application database that contains profile information about said executing application;

a third computer readable program code means, for causing the computer to access a system database that contains configuration information about the computer;

a fourth computer readable program code means for causing the computer to apply the information located in said application database and said system database to determine a set of modifications that increase the performance of said executing application; and a fifth computer readable program code means for causing the computer to make said set of modifications whereby allowing said application to more fully utilize the processing capabilities of the processor within the computer.

18. The computer program product of claim 17, wherein said fifth computer readable program code means comprises:

a sixth computer readable program code means for causing the computer to modify said application executing on the computer system;

a seventh computer readable program code means for causing the computer to modify an operating system running the computer system; and an eighth computer readable program code means for causing the computer to modify the hardware within the computer system.

* * * * *